United States Patent Office 3,494,203
Patented Feb. 10, 1970

3,494,203
LIQUID DAMPER FOR MEASURING
INSTRUMENTS
Viktor Ivanovich Efimenko, Vystavochnaya ul. 3, kv. 17, and Alexandr Fedorovich Gorodovsky, Ul. Mekhanicheskaya 3, kv. 1, both of Krasnodar, U.S.S.R.
Filed Apr. 3, 1967, Ser. No. 628,121
Int. Cl. G01d 11/10; G01r 1/14
U.S. Cl. 73—430
4 Claims

ABSTRACT OF THE DISCLOSURE

A liquid damper for measuring instruments having a movable element and a stationary element with rounded surfaces thereon facing one another and defining a space therebetween and a mass of viscous fluid retained in said space by the action of surface tension of the fluid. The mass of viscous fluid is present in an amount so as to be retained between the elements in said space when the movable element moves towards the stationary element and even upon its contact therewith.

---

This invention relates to liquid dampers for absorbing vibrations arising in the movable parts of measuring instruments.

Liquid dampers known in the art comprise a stationary element made as a hollow cylinder with a blind cavity, and a movable element in the form of a drum which is so positioned inside said blind cavity as to define with the inner surface of said cylinder a slot-like space filled with viscous fluid (cf. Swiss Patent No. 346,611, Cl. 21e, 23).

The aforesaid damper, however, suffers from the following disadvantages: inconvenience in assembly since the aforesaid slot-like space cannot be viewed; escape of damping fluid is possible when said movable drum travels in a direction perpendicular to its axis of rotation which adversely affects the reliability of the damper operation.

It is therefore an object of the present invention to eliminate the above-listed disadvantages and to provide a liquid damper for measuring instruments which is convenient both in manufacture and in assembly and is suitable for use in measuring instruments having movable mountings capable of travelling in a direction perpendicular or parallel to the axis of rotation of the movable instrument part.

Said object is accomplished due to the fact that in a liquid damper for measuring instruments which is based upon the employment of viscosity of the fluid filling the slot-like space defined by a stationary and a movable element, said fluid being retained within said space by virtue of forces of surface tension, according to the invention, provision is made for both said stationary and said movable elements being made so that the slot-like space formed by the surfaces of said elements facing each other, is enlarged towards its ends and is partially filled with fluid, the amount of the fluid being so selected that it remains within said space even when said movable and said stationary elements come in contact with each other.

Figure 1:
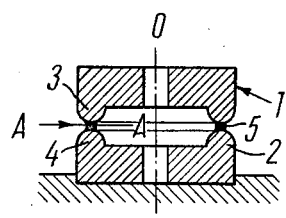
Figure 2:
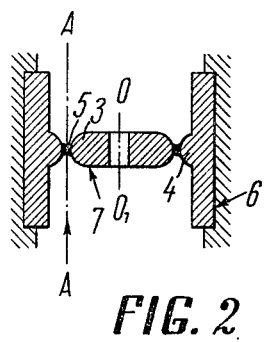
Figure 3:
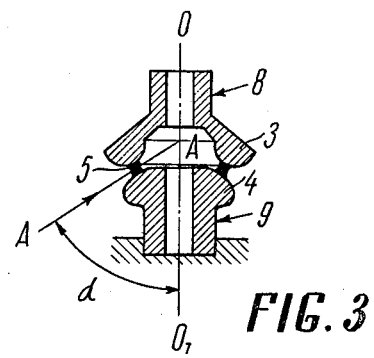

Given below is a description of the embodiments of the present liquid damper to be taken in conjunction with the appended drawing, wherein:

FIGS. 1, 2 and 3 are sectional views which illustrate various embodiments of the liquid damper, according to the invention.

The herein proposed liquid damper comprises a movable element and a stationary element made as respective bushing 1 and 2 (FIG. 1) provided with annular beads 3 and 4 which are symmetrical about the axis of rotation $0-0_1$. The beads 3 and 4 are semicircular in cross-section and define a slot-like space which is enlarged towards its ends and is filled with viscous fluid 5. In a conventional manner, the damper is part of an instrument (not shown) and the movable element 1 is connected to an indicator and is rotated together therewith about axis 0—0 in the operation of the instrument. This rotation is damped by the viscous fluid.

The abovesaid fluid partially fills the space between beads 3 and 4 and, under the effect of forces of surface tension, tends to occupy the narrowest portion thereof. When the bushing 1 moves along axis $0-0_1$ towards bushing 2 the space is narrowed and the fluid is expelled into the wider portion thereof, the amount of the fluid being so selected that it remains inside said slot-like space even when the bushings 1 and 2 contact each other. When the bushing 1 reverses its motion, the fluid, influenced by the same forces of surface tension, returns to the narrowest portion of said slot-like space.

Use can be made of polymethylsiloxane, polydimethylsiloxane, watch-maker's oil or other suitable substances as the viscous fluid for the proposed damper.

The beads 3 and 4 can be given any other shape under the condition that the slot-like space made up by them is enlarged towards its ends.

Both the movable and the stationary elements can possess various shapes as it can be seen in FIGS. 1, 2 and 3, such as the symmetrical bushings 1 and 2. Alternatively, the fixed element may be a cylindrical bushing 6 and the movable element a disk bushing 7 as shown in FIG. 2, or the movable and stationary elements may be two asymmetrical bushings 8 and 9 as shown in FIG. 3.

The line A—A in the direction of which the slot-like space is enlarged towards its ends, can define any arbitrary angle angle $\alpha$ with the axis $0-0_1$ of rotation of the movable element.

FIG. 1 shows this angle to be equal to 90°, in FIG. 2 it is equal to 0°, whereas in FIG. 3 it equals 60°.

What we claim is:

1. A liquid damper for measuring instruments comprising a movable element and a stationary element having surfaces facing one another in spaced relation to define a space therebetween, said space having a section of minimum size and a section which increases in dimension in both directions from the section of minimum size, and a mass of viscous fluid in said space and retained therein by the action of surface tension of the fluid, said mass of viscous fluid being present in an amount to be retained between said elements, in said space, as the movable element moves towards the stationary element and the fluid is displaced into the section of increasing dimension, even upon contact of movable element with the stationary element, said fluid returning to the section of minimum size as the movable element moves away from the stationary element, said movable element being rotatable relative to the stationary element about a given axis, said surfaces being formed in the shape of beads on said elements displaced from and symmetrically arranged about said axis of rotation.

2. A damper as claimed in claim 1 wherein said surfaces are shaped so that the space between the surfaces is continuously variable.

3. A damper as claimed in claim 2 wherein said surfaces of the beads are semi-circular in cross-section.

4. A damper as claimed in claim 3 wherein said beads are positioned such that the mass of fluid is visible in said space from outside the elements.

References Cited

UNITED STATES PATENTS

| | | | |
|---|---|---|---|
| 3,160,237 | 12/1964 | Reason et al. | |
| 2,569,311 | 9/1951 | Hoare et al. | 73—430 |
| 2,622,707 | 12/1952 | Faus | 73—430 |
| 3,023,362 | 2/1962 | Blizard et al. | 324—125 |
| 3,102,233 | 8/1963 | Charbonneaux | 324—125 |

FOREIGN PATENTS 651,867   4/1951   Great Britain.

LOUIS R. PRINCE, Primary Examiner

D. M. YASICH, Assistant Examiner

U.S. Cl. X.R.

324—125